United States Patent [19]
Walker

[11] Patent Number: 6,072,467
[45] Date of Patent: Jun. 6, 2000

[54] CONTINUOUSLY VARIABLE CONTROL OF ANIMATED ON-SCREEN CHARACTERS

[75] Inventor: Marilyn Walker, Boston, Mass.

[73] Assignee: Mitsubishi Electric Information Technology Center America, Inc. (ITA), Cambridge, Mass.

[21] Appl. No.: 08/642,502

[22] Filed: May 3, 1996

[51] Int. Cl.[7] .................................................. G09G 5/08
[52] U.S. Cl. .......................... 345/157; 345/156; 345/158; 345/302; 340/825.19; 704/220; 704/260
[58] Field of Search .................................... 345/156, 157, 345/158, 302, 349; 340/825.19; 704/220, 260

[56] References Cited

U.S. PATENT DOCUMENTS

| | | | |
|---|---|---|---|
| 4,925,189 | 5/1990 | Braeunig .................................. | 345/157 |
| 4,975,957 | 12/1990 | Ichikawa et al. ........................ | 704/220 |
| 5,262,777 | 11/1993 | Low et al. ............................... | 345/157 |
| 5,297,061 | 3/1994 | Dementhon et al. ................... | 345/156 |
| 5,363,120 | 11/1994 | Drumm .................................... | 345/158 |
| 5,444,462 | 8/1995 | Wamback ................................ | 345/158 |
| 5,491,497 | 2/1996 | Suzuki .................................... | 345/157 |
| 5,497,373 | 3/1996 | Hulen et al. ............................. | 345/302 |
| 5,603,065 | 2/1997 | Baneth ................................. | 340/825.19 |
| 5,616,078 | 4/1997 | Oh .......................................... | 345/156 |
| 5,682,501 | 10/1997 | Sharman ................................. | 704/260 |

*Primary Examiner*—Jeffery A. Hofsass
*Assistant Examiner*—John Tweel, Jr.
*Attorney, Agent, or Firm*—Dirk Brinkman

[57] ABSTRACT

A compact convenient hand-held, accelerometer-based computer control device is utilized to control on-screen animated characters presented by a computer-driven display in which the movement, persona, style, and voice of the character is controlled. The control device detects accelerations which are used to provide the on-screen character a particular persona, style or voice quality determined by the user. Character motion is determined by acceleration patterns based upon a learned language. The system requires only a series of easily learned hand movement patterns for corresponding character control.

The style or emotional content of the movement is specified directly from gross accelerometer outputs without pattern matching. The outputs can also be used in connection with speech synthesis to provide voice quality attributes to audible information. The system has particular relevance to control of on-screen characters in interactive theater and virtual reality systems.

13 Claims, 11 Drawing Sheets

CONTINUOUSLY VARIABLE CONTROL OF ANIMATED ON-SCREEN CHARACTERS

FIELD OF THE INVENTION

This invention relates to computer control and more particularly to a hand-held device for controlling movement, speech and persona of an on-screen graphical object, icon, or character without providing frictional contact or mechanical coupling of the device with a fixed surface or structural element. Particularly, it relates to multi-level control of continuously variable attributes of the object, icon, or character.

BACKGROUND OF THE INVENTION

As described in U.S. Pat. No. 5,347,306, issued to Tohei Nitta on Sep. 13, 1994, and incorporated herein by reference, an electronic meeting place can be provided in which conferees or participants can meet through control of on-screen characters, the movements of which are under control of the individuals. The system described in this patent utilizes cartoon characters or icons in order to avoid the problems with full-frame video teleconferencing. However, in the portrayal of one's self in terms of an on-screen character, it is necessary to provide this character with a persona, style, or mood specified by the individual participant. As described in this patent, the persona is controlled by switches on a keyboard or in a separate box so that full control can be provided over the representation of the individual participant.

It will be appreciated that the utilization of separate switches and key strokes is a cumbersome way to control the persona of the on-screen character. While it might be possible to use the traditional computer mouse to in some way control character persona or style, such a system is not easy to use and requires the individual to be at the computer terminal. It would not be possible when using the computer mouse to sit-back in one's chair or move around during teleconferencing. There is therefore a need for a more practical and simpler way to control the on-screen characters.

More particularly, as is well known, a mouse is utilized to control cursors represented on a computer screen in which the position of the cursor is controlled through the frictional contact of the mouse's roller balls with a fixed surface, usually in the form of a so-called mouse pad. While the utilization of a mouse for computer control is indeed an efficient method for control of computer operations, the mouse has not been utilized to control the persona or style of icons or on-screen characters but rather has been used to move on-screen objects by clicking on them and dragging them to different locations, with the length of the move proportional to the movement of the mouse over the mouse pad. The traditional mouse is therefore incapable of controlling the persona of a cartoon or other character which is presented on-screen in a conferencing or meeting scenario to represent the individual communicating with others in an electronic meeting place or other environment.

Specifically, in order to get a graphical object on a screen to move in a given direction with a mouse, one must click on the object and then move the mouse to drag it by specifying each location along the desired path. Thus a graphical object cannot be made to move in a desired direction without specifying each point along the way. As a result, simple movements of the graphical object cannot be made by merely directing the graphical object to go in a desired direction. Thus the mouse is inefficient both to specify simple movements and to give a graphical object a desired persona.

By way of further background as indicated in the above-mentioned patent, the movement of the individual characters representing a particular person can be controlled through data gloves, data suits, chair input devices and the like. These devices are in some sense cumbersome, and it is therefore desirable to provide a convenient and preferably hand-held device which controls not only the movement of one's individual character, but also the mood or the persona which the individual wishes to impart to his on-screen character.

As mentioned above, in this patent cartoon characters are prestored to dramatically reduce the bandwidth required for teleconferencing. During the teleconferencing scenario, the individuals participating in a conference need to be able to control how they are presented to the conferees. This is accomplished through the provision of the associated persona commands, in one embodiment by providing physical switches at each of the terminals for each of the participants in a distributed teleconferencing network.

However, the utilization of individual switches, or even a mouse driving a cursor on a screen menu is a cumbersome way in which to control what other conferees see of the individual conferee. There is therefore a requirement for a hand-held device which can be free of contact with a table or other flat surface that can be conveniently waved around by an individual conferee to permit control of his character without the requirement of wearing a data suit or a data glove, without the requirement of detecting hand or body position through optical recognition techniques which are computer intensive and slow, and without any physical attachment to a fixed structure to sense hand or finger position.

Again, by way of background, hand gestures have been utilized in communication systems for the deaf. U.S. Pat. No. 5,047,952 describes an instrumented glove to produce signals corresponding to hand configuration utilizing strain sensors. A system for converting an image to an animated cartoon-like drawing through a so-called contour extractor is illustrated in U.S. Pat. No. 4,546,383. U.S. Pat. No. 4,884,972 utilizes a mouse to select words for animated characters, whereas U.S. Pat. No. 4,906,940 describes a system for extracting features and images for machine control. Moreover, U.S. Pat. No. 5,008,946 describes a system sensing the movement of one's pupil and one's mouth to control a car, whereas U.S. Pat. No. 4,414,537 shows a man-machine interface utilizing a data glove. U.S. Pat. No. 4,567,610 illustrates a reference histogram for pattern recognition, whereas the following articles and thesis describe hand gesture recognition systems and adaptive interfaces relating to hand gestures:

Tomoichi TakahaShi and Fumio Kishino, Hand Gesture Coding Based on Experiments Using a Hand Gesture Interface Device, SICCHI Bulletin, April 1991; Interpreting Sign Language, IEEE Computer Graphics & Applications, January 1994, pps. 36–37; Jennifer A. Hall, The Human Interface in Three-Dimensional Computer Art Space, media Lab, Massachusetts Institute of Technology, MSVS Thesis, Oct. 18, 1985; and, S. Sidney Fels, Building Adaptive Interfaces with Neural Networks: The Glove-Talk Pilot Study, Department of Computer Science, University of Toronto, Tech Report No. CRG-TR-90-1, February 1990.

It will be seen that while there are various methods of hand gesture recognition, they rely on multiple hand gestures for computer control. As such, signing recognition is much too complicated for machine control, as the difference in the various hand signs are difficult to recognize, and the language associated with hand signing too complex for machine control.

Note that in terms of arcade games, joy sticks, and the like control graphical objects through the use of strain gages and switches, with the strain being measured between a fixed structure and the joy stick. These are simple systems which do not analyze strain gage waveforms nor combine waveforms for graphical object control. Thus, there are no comparisons or correlations with templates that can be used to establish the existence of a given gesture or series of gestures. As a result television game control devices generally do not provide a sufficient level of sophistication to control the persona of graphical objects representing human beings.

Furthermore, such systems do not provide for adjustments in the attributes of character motion or control. When a motion is performed, it is always performed in exactly the same manner. On the other hand, persons have different characteristics to their motions depending upon the person, the emotional state of the person, or context of the motion. All of the gesturing systems fail to provide for variable characteristics of personal motion.

Interactive programs permit the control of certain characters in relation to other characters provided by a program. Such interactive programs may include theatrical productions or virtual reality systems. For such systems, the total control of the character, including variation in the attributes of motion, would provide a more realistic representation of a character. Existing systems do not permit such operations. Furthermore, with interactive programs, speech synthesis provides a portion of the interaction. Variation of the voice quality is imperative to provide a realistic character as situations change. Existing control systems do not permit variations in speech synthesis.

SUMMARY OF THE INVENTION

What is provided in one embodiment for the control of graphical objects is a hand-held device which is moved or waved around by the individual in a series of motions or patterns. Each pattern or series of patterns results in control of the on-screen character. In one embodiment, an egg-shaped device is provided with internal orthogonally-oriented accelerometers, with the sensed accelerations being converted via an analog-to-digital converter to signals which are transmitted to the computer. The accelerations provided by different hand gestures or movements may be identifiable through the utilization of templates which provide histograms of the patterns to be recognized. Correlation of raw data to the templates provides for the generation of control signals for generating the motion control of the appropriate on-screen graphical object.

In such embodiments the system includes a training session in which an individual trains the system for the particular patterns he desires for the control of the graphical object in question. After the training session, the accelerations are utilized to control the on-screen graphical object so as to either move the graphical object or provide it with specific types of actions.

In another embodiment once particular movement is selected for an on-screen icon or character, raw accelerometer outputs are used directly to control the intensity or style of the on-screen character. The style can be used to illustrate a specific mood or type of persona. The accelerometer outputs can also be used for modifying synthetic speech in order to maintain the mood or persona of the character.

Because in one embodiment the hand-held device is in the form of an egg, the egg-shaped device has a natural orientation when grasped by the hand. This gives the user the perception or tactile feedback as to how to move the device to achieve, for instance, the desired direction of movement. As contrasted to a ball-shaped device or any device with point symmetry, the use of the egg gives the device a perceived up orientation to make it natural to specify other directions with hand movements.

In a preferred embodiment, the accelerations are normalized to the local gravitational field vector both to provide a stationary reference for the analysis of the accelerations regardless of the orientation of the device within the hand, and also to resolve any aliasing or 180 degree ambiguity, making device orientation irrelevant.

In a further embodiment, and to eliminate false activation of the graphical object control system, a button is placed on the device, in the egg embodiment at the top of the egg, which is actuatable by the thumb in order to start the acceleration detection process. Prior to thumb activation, all accelerations are ignored, whereas during the depression of the thumb switch, acceleration data is transmitted for decoding and graphical object control.

It will be appreciated that what is provided is a hand-held device which operates in free-air in an untethered state and requires no physical contact with a fixed structure for the provision of computer control information. As such the subject hand-held device is said to be non-contactual. Rather, the device fits easily within the hand, and in one embodiment is not umbilically tied to the computer, but rather communicates with the computer control system via wireless data transmission.

The convenience of such an ergonometrically designed computer control device makes it easy for the participants in an electronic meeting place type conference or in interactive theater to control their associated characters. During a conference or theatrical presentation, for instance, an individual depicted by his/her character to be seated at a table may be made to rise from his/her seat and pace off, as if in anger; or may be made to appear either bored or agitated, completely at the discretion of the individual controlling the representation of himself/herself. Thus the movement of the character and the persona of the character can be easily controlled with a pleasing hand-held device in which the orientation of the device within one's hand is not critical to the ability to effectuate character control or graphical object control through a limited series of highly-defined hand gestures or movements.

As part of the subject invention, a series of gestures may be considered to be a language such that when the gestures are performed in a predetermined sequence, the correlation is made to a particular type of computer control. Thus while the system will be described in accordance with the control of graphical objects, computer control through a language of a series of sensed motions is within the scope of this invention.

In summary, an unconstrained, hand-held computer control device, in one embodiment accelerometer-based, is utilized to control graphical objects in a computer-driven display in which the movement, attributes, style, and persona of the graphical object is controlled through movement and resulting accelerations of the hand-held device, such that computer control is effectuated without the requirement of a roller ball contacting a fixed surface to provide positional input. In another embodiment, motions are used to provide voice quality to speech of a computer represented character. In one embodiment a series of easily learned hand movements or gestures provide for the corresponding graphical object control in which one or more hand gestures or movements are detected serially as a language to obtain the appropriate movement or persona of the graphical object presented on-screen. In order to make device movement recognition independent of device orientation, in a preferred embodiment accelerations in the X and Y directions are referenced to the local gravity vector, making it unnecessary to ascertain the orientation of the hand-manipulated device in order to provide highly recognizable hand movement and gesture recognition. In one embodiment, the device is egg-shaped to provide a preferential orientation of the device in the individuals hand, thereby to be able to specify a general up direction for the device. In another embodiment, a z direction accelerometer increases the number of hand movements or gestures that can be recognize. With a button or switch at the top of the egg, in a further embodiment, providing an actuation signal for the start of the detection process, thus to eliminate false activations. In a preferred embodiment the control device is wireless for ease of use, whereas in another embodiment, the control device includes accelerometers and a processor mounted at the top of a wand, with electrical connections at the base of the wand being hard wired to the computer. Also, as part of the subject invention, any computer-driven graphical object may be controlled such that the hand-held device provides the requisite generalized computer control, with visual feedback being provided by the display.

BRIEF DESCRIPTION OF THE DRAWING

These and other features of the Subject Invention will be better understood in connection with the Detailed Description taken in conjunction with the Drawings of which.

DETAILED DESCRIPTION

Figure 1:
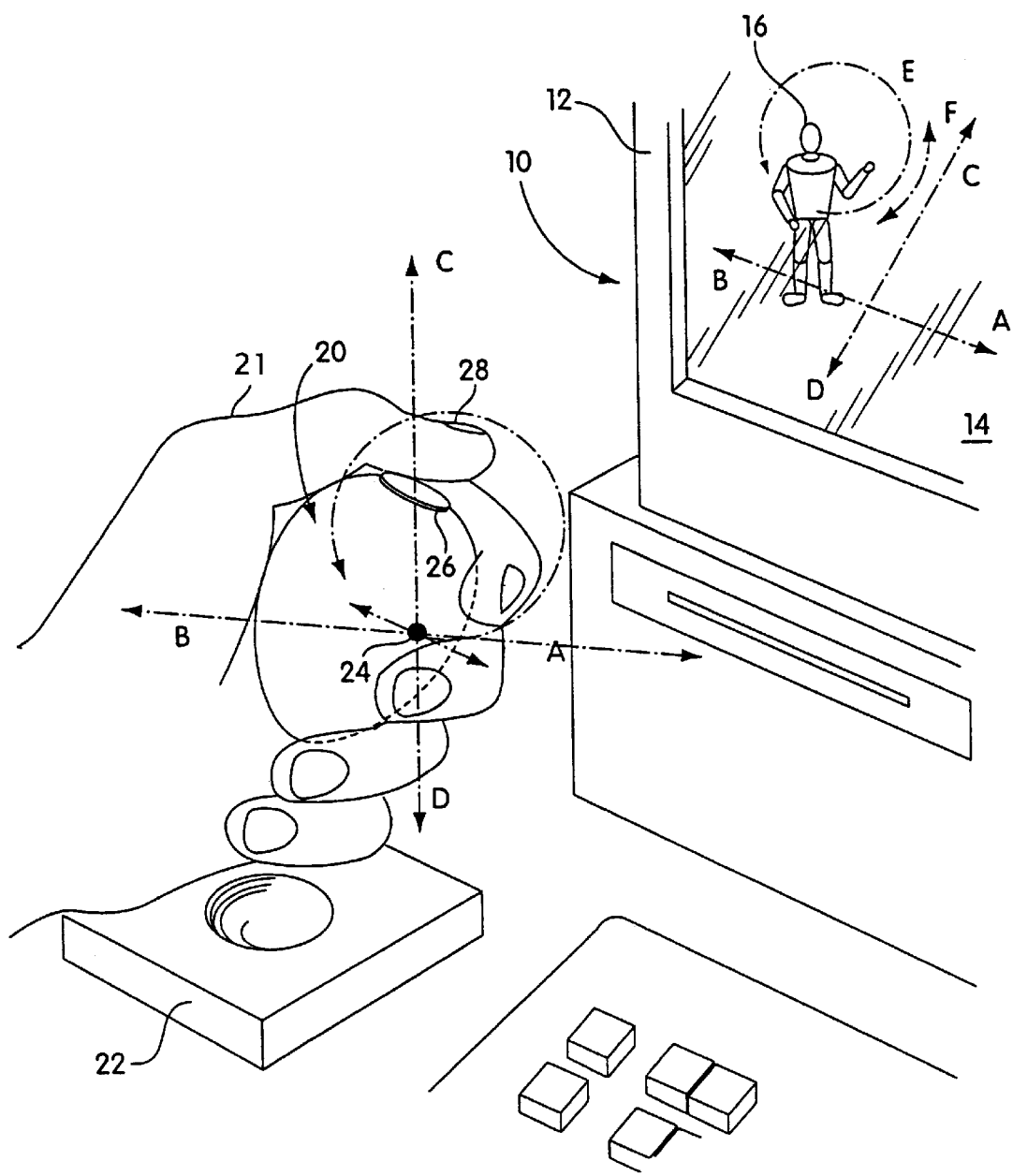
FIG. 1 is a diagrammatic illustration of the subject egg-shaped computer control device illustrating movement of the device and corresponding motion and persona control of the individual's on-screen character.

Referring now to FIG. 1 in a typical electronic meeting place scenario, a computer generally indicated at 10 includes a monitor 12 having a screen 14 in which a cartoon character 16 is depict ed. In order to control the movement or persona of character 16, a hand-held device 20 generally in the form of an egg is grasped by a hand 21 so that the egg, when picked up from its holder 22 can be made to move generally in the directions indicated by A, B, C, D, E, and F thereby to effectuate control of character 16, in one embodiment, in corresponding directions.

It will be appreciated that while the subject invention will be described in terms of the aforementioned movements, the movements of device 20 may be made to control different motions or personas of the graphical object. However for ease of discussion, it will be appreciated that in the embodiment shown, device 20 when moved from its original rest origin 24 in the direction of dotted arrow A results in movement of character 16 in the direction of dotted arrow A on screen 14. Thus when grasping device 20 and moving it from a rest position towards the right, character 16 moves towards the right at a predetermined speed and for a predetermined length of time.

Likewise when device 20 is moved to the left as indicated by dotted arrow B, then character 16 is made to move backward as illustrated by dotted arrow B on screen 14.

In a like manner with device 20 moved from a rest position in an upward direction as illustrated at C, then character 16 can be made to move away from the plane of the screen, whereas for a movement of device 20 from a rest position in a downward direction as illustrated by dotted arrow D, the character may be made to move towards the screen.

Of course, if the device is made to move in a circular pattern as illustrated by dotted arrow E, the character, in one embodiment, may be made to do a flip as illustrated by dotted arrow E on screen 14.

While the above relates to motions of the character, it is possible for instance to provide the character with an agitated state by moving the device back and forth in the direction of dotted arrow F in a shaking motion which, inter alia, could make the character 16's hand to move back and forth as illustrated by double-ended arrow F on screen 14.

What will be appreciated is that movement of device 20 in free air results in a predetermined motion or characteristic of the corresponding on-screen character or graphical object, with there being no tethering of the device to the computer-driven display, and without contact of the device with a fixed structure or object such as a mousepad.

As will be described in connection with FIG. 2, device 20 may be provided with accelerometers to sense the motion of device 20, with the outputs of the accelerometers being analyzed to determine the accelerations of the device. In order to eliminate false actuation, device 20 is provided with a switch 26 depressable by thumb 28 such that only those motions are detected which occur during the depression of the switch.

While the subject invention will be described in terms of accelerometers, it will be appreciated that any means for sensing the motion of device 20 is within the scope of this invention. Whatever motion detection system is utilized, the actuation thereof via a switch on the device eliminates false indications of motion regardless of cause.

Figure 2:
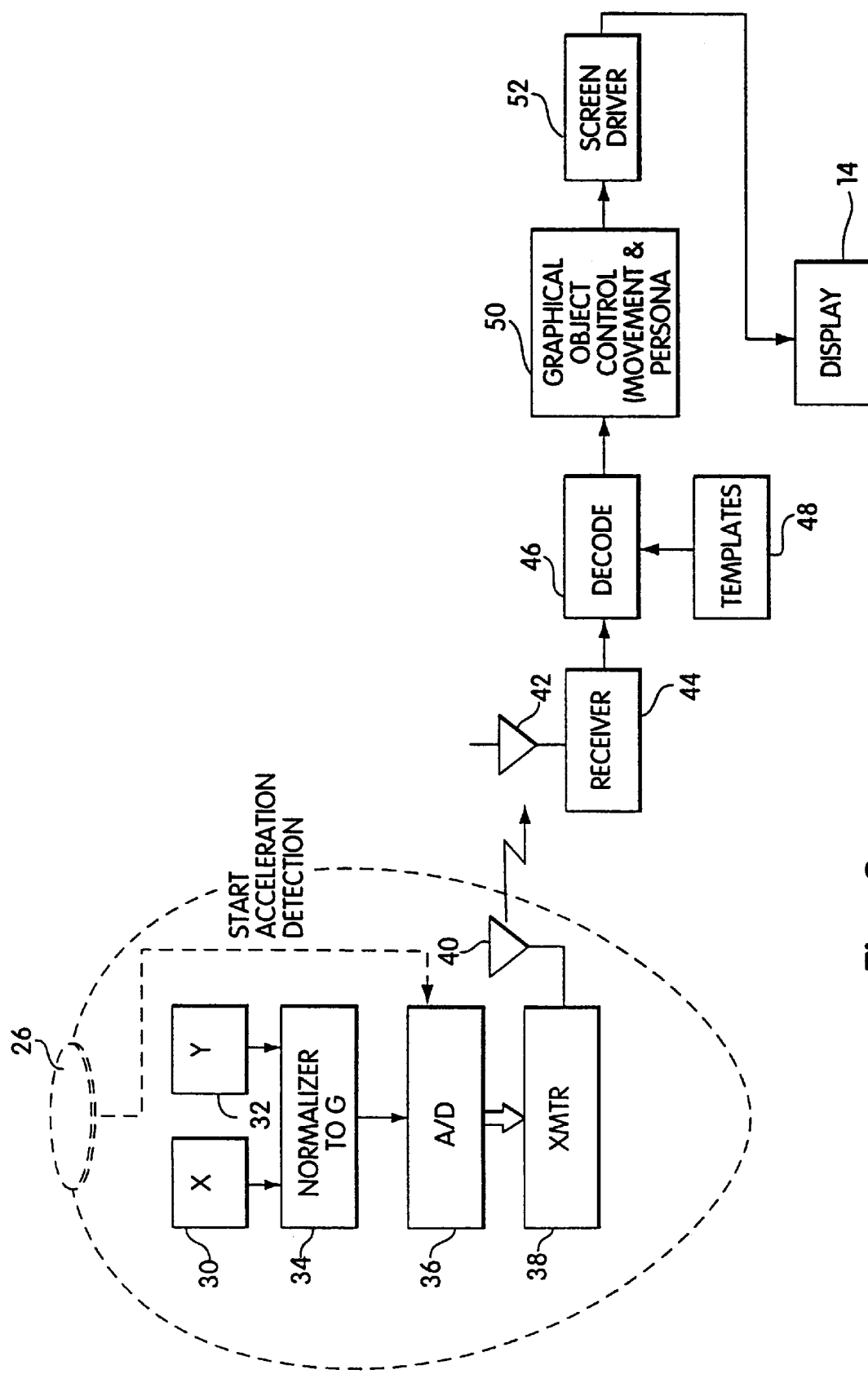
FIG. 2 is a block diagram of the subject system illustrating the detection of device accelerations, the conversion of the analog accelerations to a digital format, the transmission of the acceleration information to a receiver and the decoding of the information to provide graphical object control.

Referring now to FIG. 2, device 20 includes orthogonally oriented accelerometers 30 and 32 oriented respectively in the X and Y directions, the outputs of which are normalized to the local gravitational field vector G by unit 34 to make device 20 orientation independent.

The raw accelerations, normalized to the local gravitational vector, are converted from analog form to digital form by an analog-to-digital converter 36, with the output of converter 36 being transmitted via transmitter 38 and antenna 40 to antenna 42 and receiver 44. The output of receiver 44 is decoded at 46 to ascertain the particular motion which has occurred via comparison of the accelerations transmitted to receiver 44 with accelerations corresponding to templates 48 which have been prestored in a training phase. The matching of the sensed accelerations with the template accelerations results in a decoded signal being applied to a graphical object control unit 50 which provides drive signals to a screen driver 52 to control the movement of a character or graphical object on display 14 as described in connection with FIG. 1.

What is provided is a wireless non-contactual system for controlling the movement or persona of a graphical object in the form of a character through the free-air sensing of accelerations of a hand-held device.

In one embodiment, device 20 is in the form of an egg which automatically establishes an orientation for the device within one's hand. It will be appreciated that the movements allowed in the subject context are in a plane parallel to the plane of the screen, with the X and Y accelerations not only normalized to the local gravitational field but also normalized to a plane parallel to the screen.

It will be appreciated that an additional accelerometer in a direction orthogonal to the first two directions, such as the z-axis, permits the generation of three acceleration vectors, thereby to extend the number of hand motions which can be recognized by the system.

Figure 3:
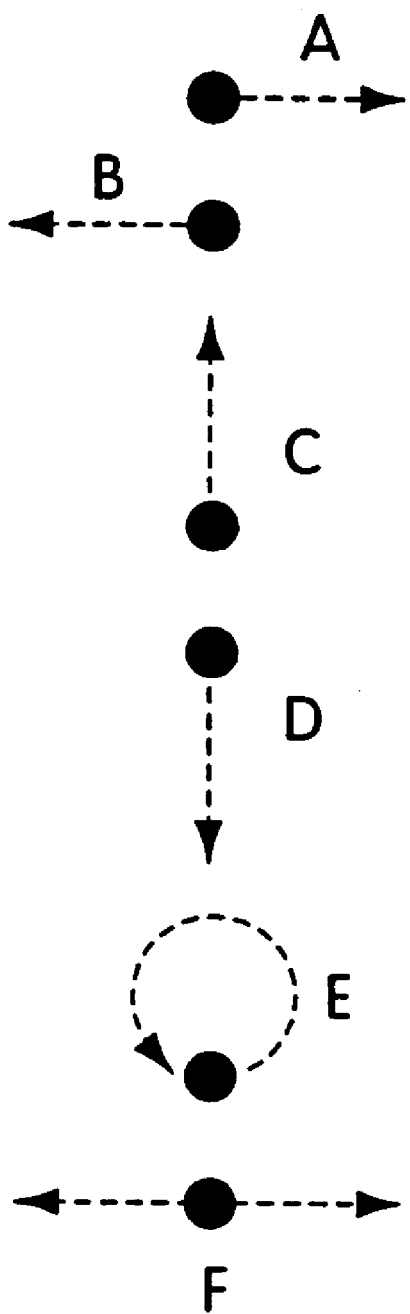
FIG. 3 is a series of vector diagrams illustrating the motions that provide graphical object control for the graphical object of FIG. 1.

Referring to FIG. 3, it will also be appreciated that the motions of device 20 of FIG. 1 which are utilized to control graphical object 16 are those indicated by the dotted arrows. In this case, six motions of device 20 of FIG. 1 are recognized as motions which can effectuate different control scenarios for the graphical object.

Figure 4A:
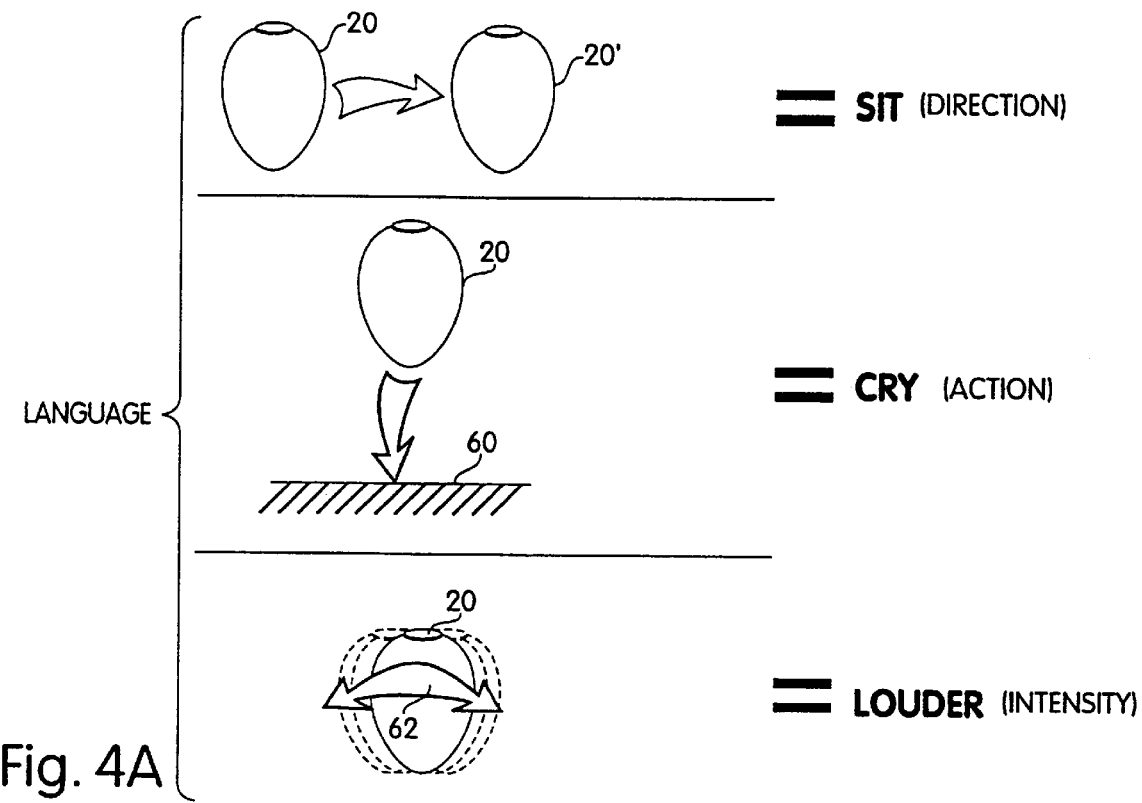
FIGS. 4A and 4B illustrate a language comprising a series of device movements which either individually or serially provide for graphical object control, in which in one embodiment the language includes a movement to specify direction, followed by a movement to specify an action and followed by a movement to specify an intensity, all for the control of the graphical object.

Referring now to FIG. 4A, note that a different sequence or series of motions of device 20 can result in a language to control the on-screen character to execute complex actions. For instance, as illustrated in FIG. 4A, the on-screen graphical object corresponding to a character can be made to sit, cry, and to do so at a loud intensity. In this case device 20 is moved to the right to signify through the detection of its accelerations a sit control signal. The first movement of device 20 in general indicates a movement of the graphical object. Thereafter, device 20 may be moved downwardly to pound against a fixed surface 60, thereby setting off a number of undamped transients to provide signals to control the graphical object to cry. The intensity of the crying may further be controlled by the movement of device 20 in the shaking motion illustrated by double-ended arrow 62 to indicate that the action described in the second of the device 20 motions is to be more intense, whatever that action is.

A language is therefore developed in which a first motion of device 20 may be a direction for the graphical object to move, whereas the second motion of device 20 may specify an action, in this case crying with tears coming down from the eyes of the on-screen character. Finally, a further detected motion may be utilized to control the intensity of the action, in this case, the crying.

Figure 4B:
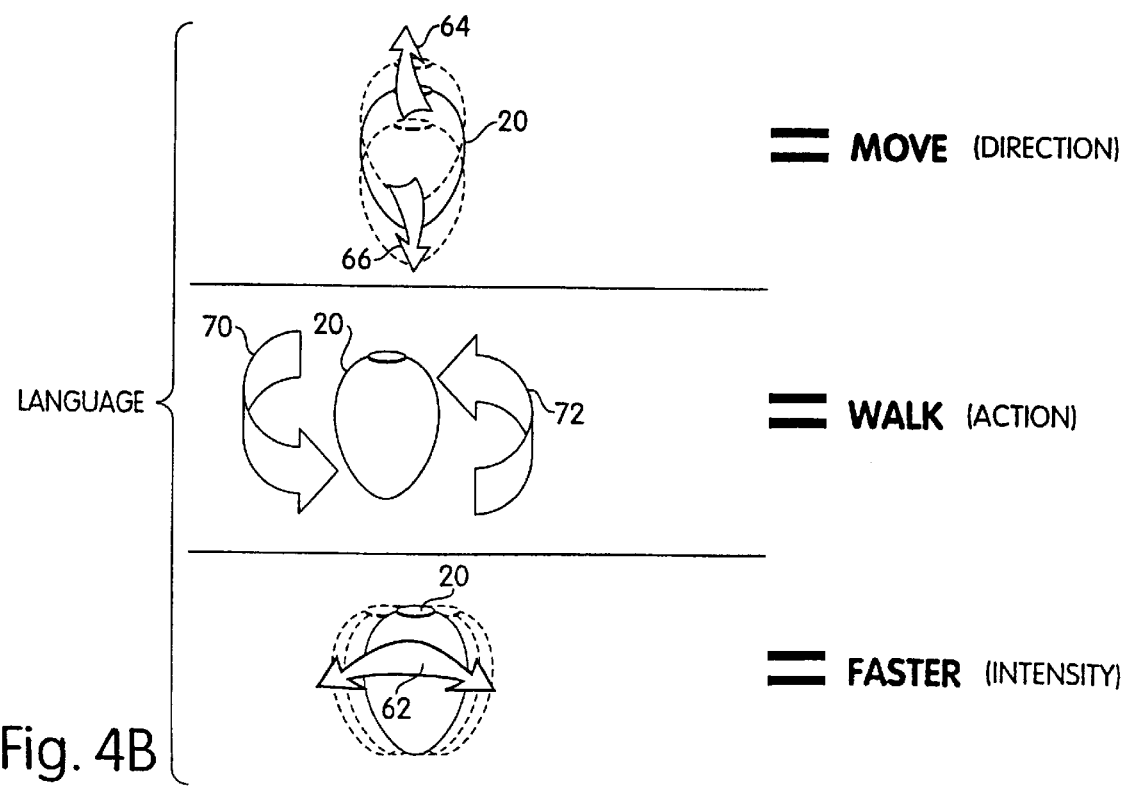

Such a language is also illustrated in FIG. 4B in which movement of device 20 up and down as illustrated by arrows 64 and 66 causes a movement of the graphical object, whereas quick rotation of device 20 in a subsequent move in the direction of arrows 70 and 72 causes a walking action of the on-screen character. Finally the same motion of device 20 as that illustrated at the bottom of FIG. 4A causes the intensity of the action, in this case walking, to be faster.

What will be appreciated is that by a series of device movements, various actions and personas can be imparted to the on-screen character.

Figure 5:
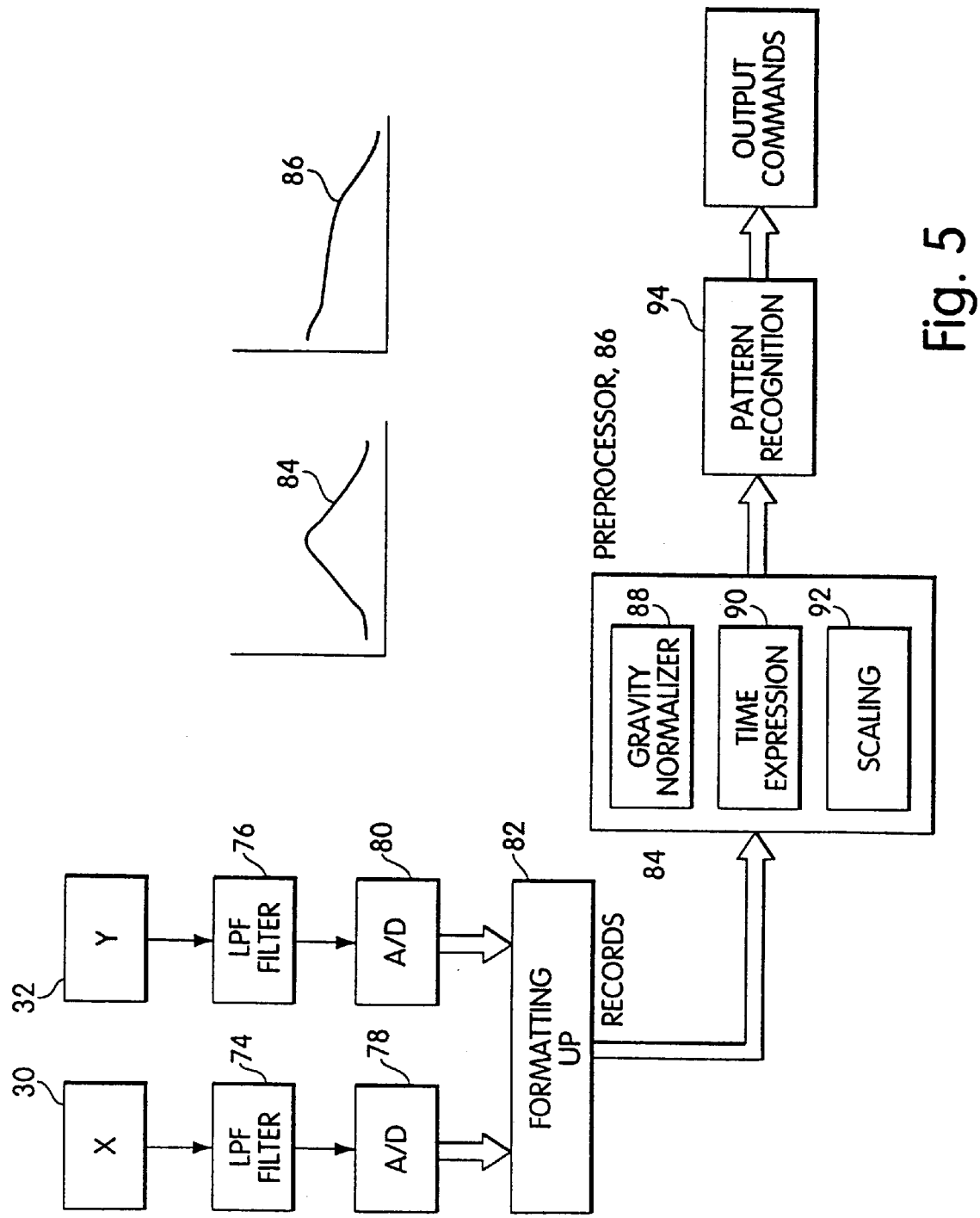
FIG. 5 is a block diagram of the subject system illustrating preprocessing functions.

Referring now to FIG. 5 in more detail, accelerometers 30 and 32 are conventional monolithic accelerometers with signal conditioning. These devices are Available from Analog Devices of Norwood, Mass. as model ADXL 50. Accelerometers of this type have general application for airbag deployment in which accelerations produce output voltages from 0 to 5 volts, plus or minus 50 G. The frequency response of these accelerometers is DC to 1 kilohertz. It will be appreciated that with a sampling rate of 244 hertz, the Nyquist limit is 122 hertz. In order to provide a robust system, low pass filters 74 and 76 filter out responses above 72 hertz which in general are undetectable by the subject system, with the filters also filtering out any 120 hertz noise due to 60 cycle AC power supplies.

The outputs of filters 74 and 76 are applied to analog-to-digital converters 78 and 80. In one embodiment these analog-to-digital converters are 8 bit, 0 to 5 volt digital sampling devices in general available as part of a formatting microprocessor 82, manufactured by Motorola Inc. of Scottsdale, Ariz. as Model MC68 HCll. It is the purpose of the analog-to-digital converters to convert the analog outputs of each of the accelerometers as filtered and as illustrated at 84 and 86 respectively into a digital format corresponding to records. In one embodiment the records are 4 bytes long, with 1 byte for each accelerometer, 1 byte reserved and 1 byte for time stamp and phase information for the beginning and end of a record. The output of microprocessor 82 is provided to a host computer 84 which provides a number of preprocessing functions as illustrated at 86. The first of the preprocessing functions is a gravity normalization function as illustrated at 88. In order to accomplish this, the data is subjected to high-pass filtering to separate out data above and below 0.1 hertz. The data below 0.1 hertz is deemed to be gravitational data, whereas the data above 0.1 hertz is deemed to be user data. It is then possible to subtract out the gravitational component from the user data to provide data normalized to the gravitational field. It will be appreciated that all the data can be represented as an X, Y vector with the gravity information being in a given direction and the user data in another direction. The combination of these two vectors yields an angle by which the user data may be rotated to move from device coordinates to real world coordinates specified by the gravitational vector. In this manner, graphical object control can be made independent of device orientation within the hand.

It will be appreciated with orthogonally-oriented accelerometers that the orientation of the device within one's hand is irrelevant. However, when a third accelerometer is utilized in a mutually-orthogonal direction to the directions of the first two above-mentioned accelerometers, then it may be important to be able to establish, other than by gravity, an up direction for the device for specifying rotation about the device's longitudinal axis.

In terms of the shape of the computer control device, an important reason for an egg shaped or non symmetrical device is to give the user a feedback as to what, in his perception, is an up or down direction or in fact any other predetermined direction. While the system described above does not require foreknowledge of device orientation, it is convenient for the user in effectuating the hand movements he desires to believe that direction makes a difference in terms of the device he is holding. In short, the asymmetrical egg gives the user a means of telling the computer a given direction.

Preprocessor 86 also provides a time expansion function as illustrated at 90 in which all gestures are normalized to a time scale, for instance, to 2 seconds. Thus if the, gesture takes shorter than 2 seconds, its effective length is lengthened to 2 seconds for comparison purposes. In order to accomplish the time expansion, half second pauses of less than one half G are detected to indicate the beginning and end of a gesture, with the accelerations therebetween expanded to this normalized time slot.

Preprocessor 86 prior to gravity normalization and time expansion performs a scaling function as illustrated at 92 to convert numbers from 0 to 255 to an actual acceleration in terms of G. The result is the conversion of accelerations to a negative 3.3 Gs to a positive 3.3 Gs.

The result of the preprocessing is applied to a pattern recognition circuit 94 which forms part of the decoding unit 46 of FIG. 1. The pattern recognition matches the preprocessed accelerations to templates of accelerations which have been previously stored in a training phase such that with appropriate pattern recognition the corresponding output commands are transmitted to graphical object control unit 50 of FIG. 1.

In one embodiment pattern recognition in the subject invention utilizes the K Nearest Neighbor Algorithm, in which the data comes out as 128 numbers which are then compared with the distance between all the previously stored samples as calculated in a 128 degree space. Here the correlation is the Euclidean distance. For example, given that a data point includes 128 different samples corresponding to a single point in a 128 dimensional space, each of the previously recorded samples is represented in 128 dimension space such that when a new point in this 128 dimension space arrives, this data is compared to all previously recorded gestures as points in this 128 dimension space. K is an arbitrary number picked to find a gesture corresponding to-that set of points which is closest to a previously recorded gesture. It has been found empirically that a good number for K is the square root of the total number of points available. Of the K points found, the gesture detected is that which most quantitatively is represented in the K nearest neighbors.

The K Nearest Neighbor algorithm is used to perform the pattern recognition computation required to classify a new control device movement as matching a particular recorded gesture. A database or learn set of gestures is first created by repeating each individual gesture or class ten times and recording each instance as an element of the class. Each element is represented by a vector of 128 real numbers. When a new input gesture is to be classified, a Euclidean distance is calculated between it and every element of every class of the learn set. These distances are then sorted in ascending order. A K value is then calculated as the square root of the size of the learn set as recommended by Devijer & Kittler, Pattern Recognition Theory and Applications, New York, Springer-Verlag, 1987, and whichever class is most numerous in the first K distance values is determined to be the matching gesture.

The Euclidean distance between two 128 dimensional vectors, is defined as the square root of the sum of the squares of the difference of each value:

square root $((A1-B1)+(A2-B2)^2++(A128-B128)^2)$

A simple algorithm for identifying pauses in movement is used to separate gestures for pattern recognition. A pause is defined as motion less than 5.0 m/(s*s) for a minimum duration of 0.4 seconds. A gesture consists of the motion between two pauses, and is limited to 2 seconds; Gestures that take longer than 2 seconds to complete are ignored.

Figure 6:
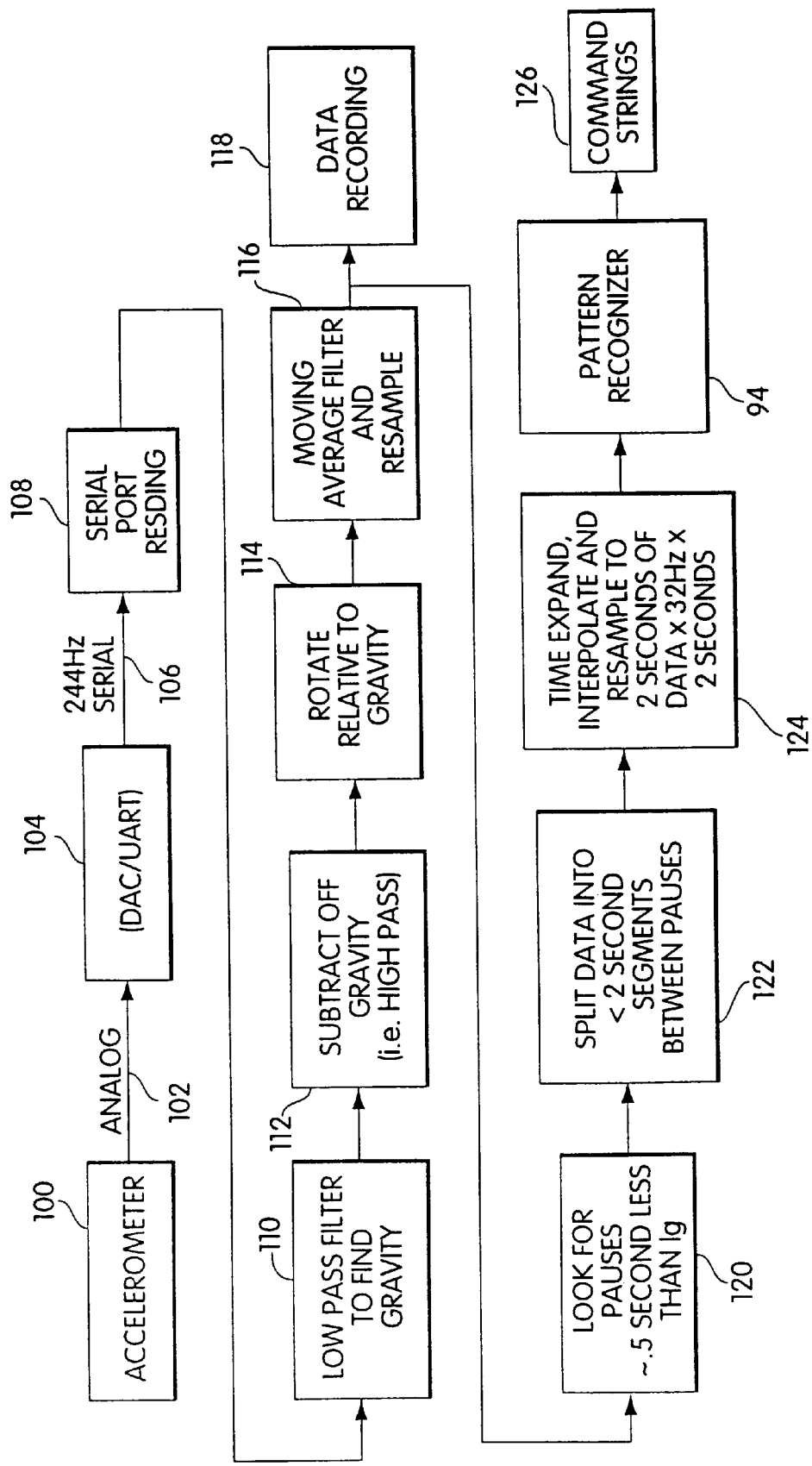
FIG. 6 is a more general block diagram of the subject system.

More generally and referring now to FIG. 6, the subject process can be described as follows. From a more general point of view, accelerator 100 provides an analog signal 102 which is low pass filtered and applied to a DAC/UART 104 which is the aforementioned 6811 microprocessor to provide a serial output 106 coupled to the serial reading port 108 of the aforementioned host computer. The output of the serial port is low pass filtered to find gravity at 110, with the gravity being subtracted off via a high-pass filter function 112 to reference the accelerations to the local gravitational field as illustrated 114. This data, having been sampled at 244 hertz is resampled at 30 hertz via a moving average filter 116, the output of which is recorded at 118 for future gesture recognition.

The output of filter 116 is also applied to a unit 120 which seeks to normalize the gesture detection system by looking for pauses to separate the gestures, in one embodiment by looking for one half second pauses of less than one half G. Thereafter the data is split into less than 2 second segments, that being the arbitrary length of analysis for gesture recognition at 122. Time expansion is accomplished at 124 through an interpolation and resampling normalized on the 2 second interval. The result is a 128 data point vector with data sampled at 32 hertz times 2 sensors and 2 seconds. The output is applied to the aforementioned pattern recognition unit 94 to produce the output commands or command strings.

Figure 7:
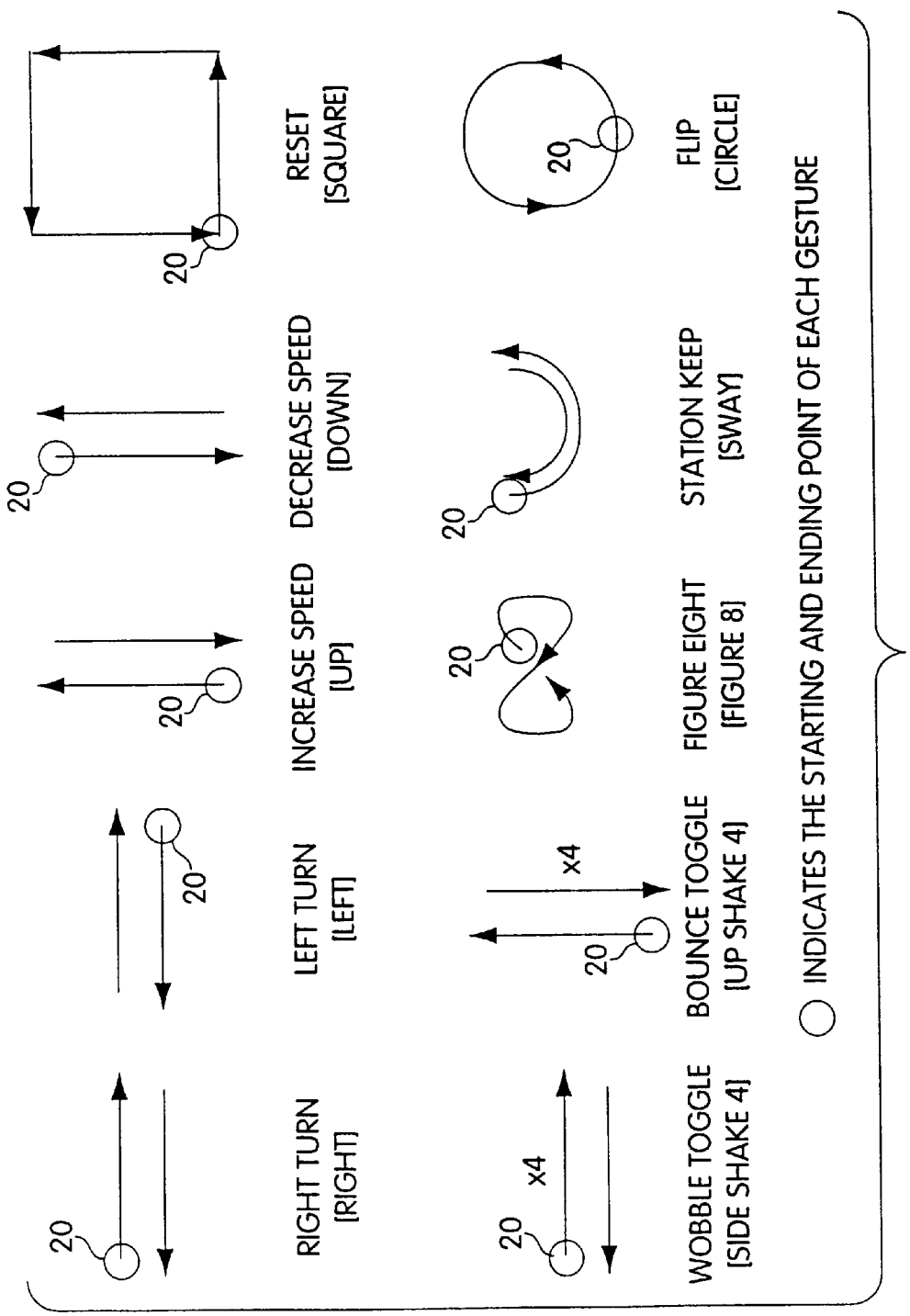
FIG. 7 is a series of diagrams describing the motion of the computer control device to achieve the indicated on-screen action of a predetermined character or icon.
Figure 8A:
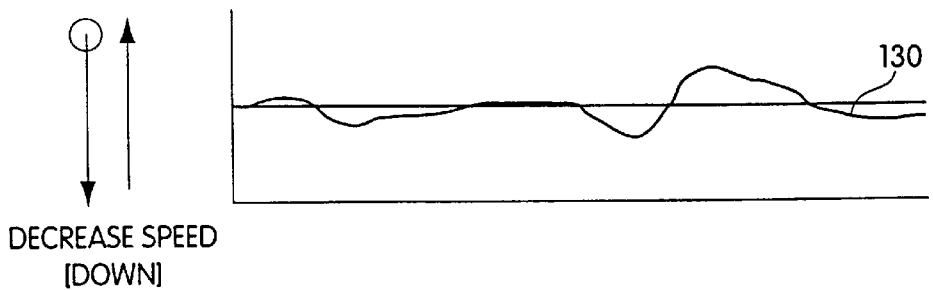
FIGS. 8A–8J are combined acceleration waveforms derived from the raw accelerations from orthogonally oriented accelerometers within the computer control device of FIG. 1, with the waveforms corresponding to various motions of the computer control device to effectuate the indicated on-screen character control.
Figure 8B:
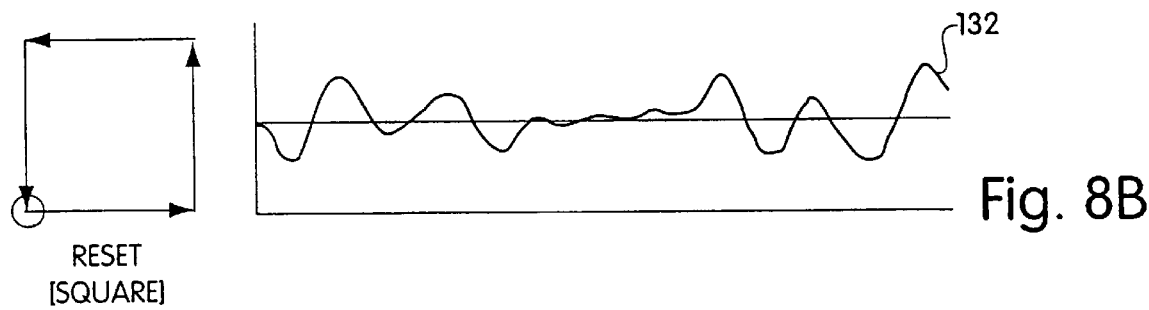
Figure 8C:
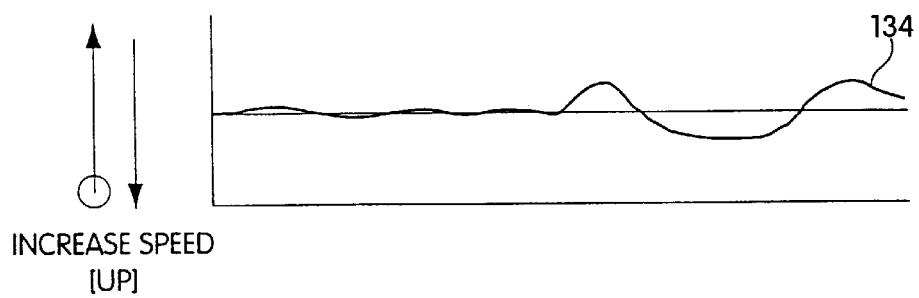
Figure 8D:
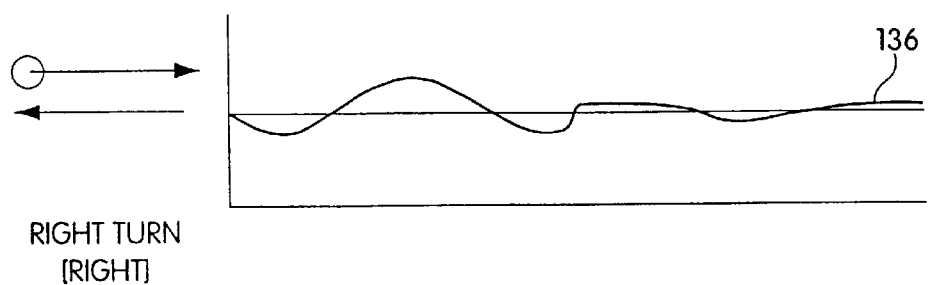
Figure 8E:
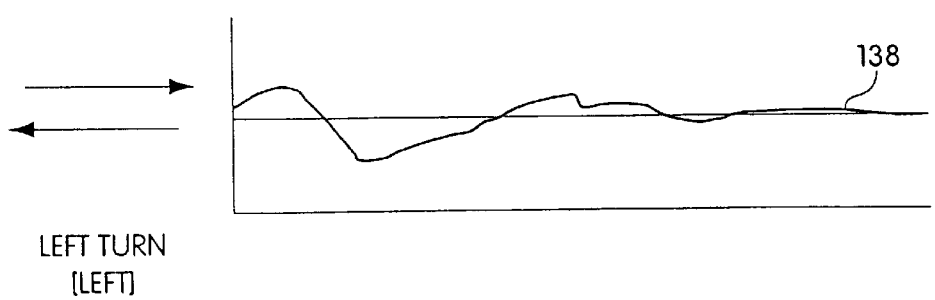
Figure 8F:
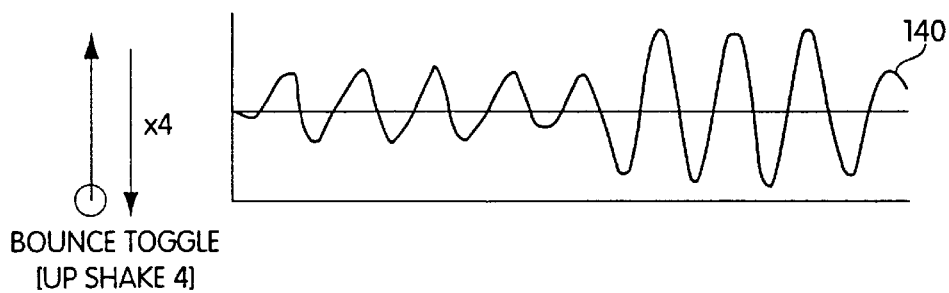
Figure 8G:
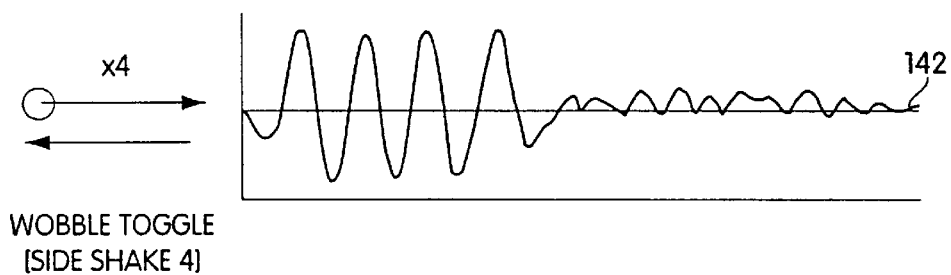
Figure 8H:
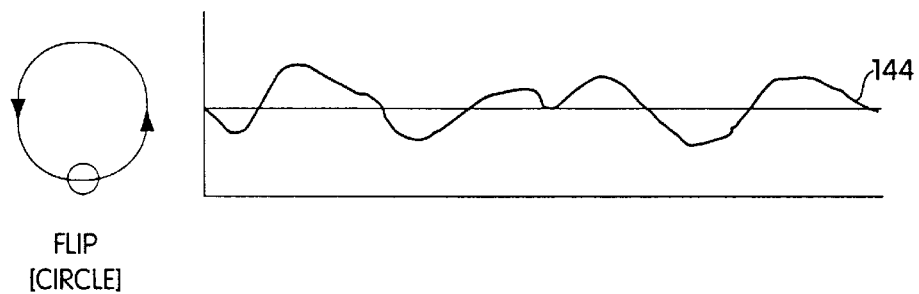
Figure 8I:
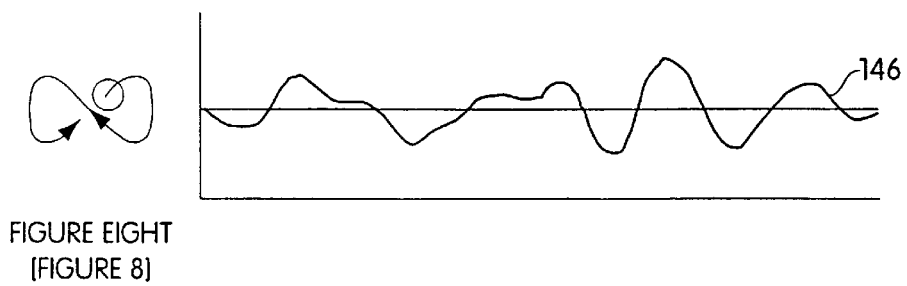
Figure 8J:
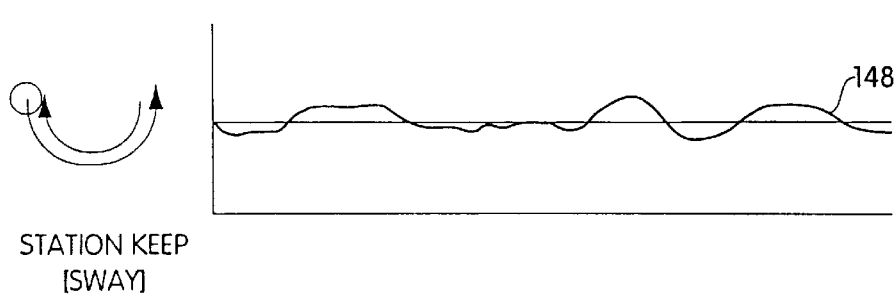

Referring now to FIG. 7, various movements of the computer control device result in various prescribed on-screen motions for the character or icon. For instance, movement of hand-held device 20 quickly to the right and then to the left indicates to the system that a character right turn is required. A left turn is illustrated when device 20 is moved quickly to the left and then to the right. An increase in speed is illustrated as a quick movement of device 20 upwards, followed by a downward movement, and a decrease in speed is indicated oppositely. Reset is defined by a square movement of device 20, right, up, left, down. Four quick movements of device 20 right and left represents a sideways shaking, while an vertical shaking is represented by four movements up and down. Other motion patterns of the device 20, such as a figure eight, sway and circle can also be defined to correspond to specific types of motion.

FIG. 8 illustrates the corresponding combined acceleration waveforms corresponding to the motions illustrated in FIG. 7. During a learning phase, each of the motions would be performed. After each motion, the corresponding motion is entered into the computer control. Corresponding motions could be selected from a set of predefined motions, or can be provided as a set of changes to the character. The keyboard can be used to enter the motions, or a different type of pointing device can be used during the learning phase.

During the learning phase, each acceleration pattern is stored and associated with the corresponding entered motion. During operation, the acceleration patterns are matched with the stored patterns to determine the desired motion. The character is then moved according to the determined motion.

Figure 9:
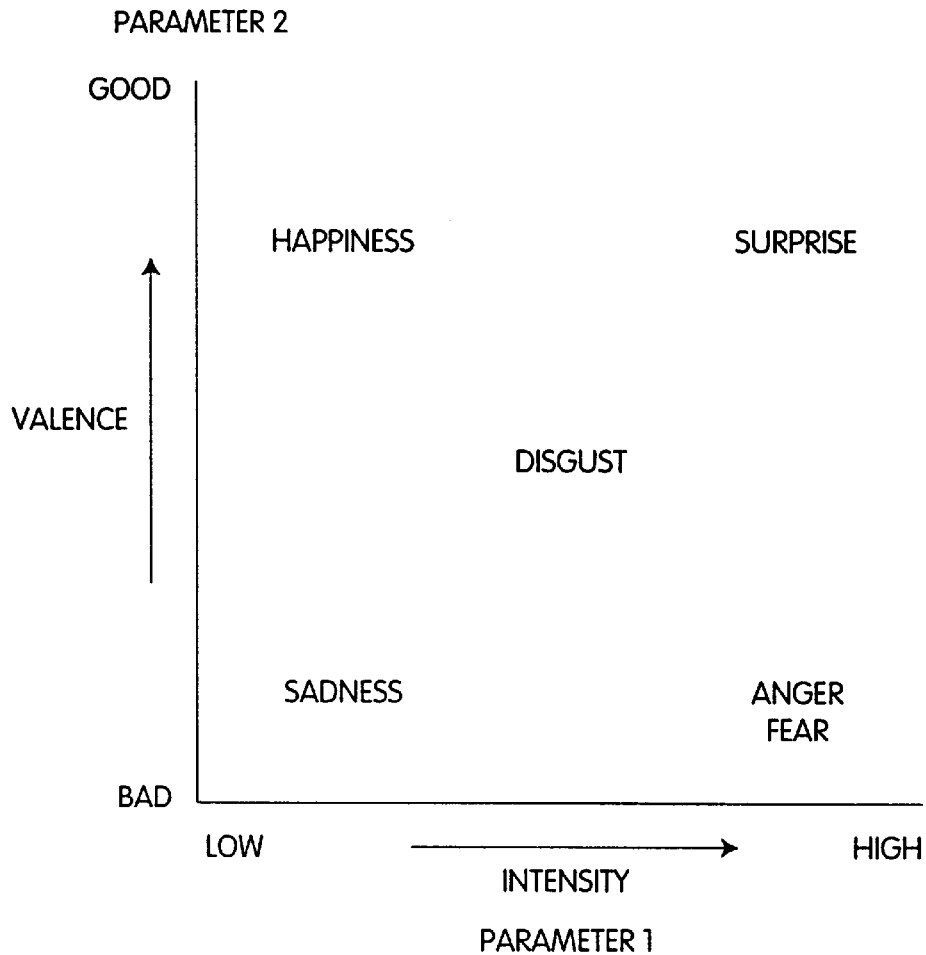
FIG. 9 is a graph of intensity of action versus valence for specifying an entire range of human emotion to arrive at a set of parameters to control the emotive content of an on-screen character.

According to another embodiment of the present invention, the outputs of the accelerometers to provide style or emotion to the character movement. FIG. 9 illustrates use of two parameters to select emotional content of motion. A first parameter, shown on the X axis, represents the intensity or strength of the emotion; a second parameter, shown on the Y axis, illustrates the valence or type of emotion. Several emotions represented by the combination of intensity and valence are shown. Thus, a low intensity represents happiness with a good valence, and sadness with a bad valence. Similarly, a high intensity represents surprise with a good valence and anger or fear with a bad valence. The accelerometer outputs can be used to represent the value of each of the two parameters for selecting the desired emotion. Since the accelerometer outputs are continuous, any variation of the emotions can be selected by proper motion of the device 20.

The emotional attribute can be illustrated in certain characteristics of the movement, particularly speed and amplitude. For example, a sadness can be represented by movements which are slow and have small amplitudes; surprise can be represented by fast movements of greater amplitude.

Figure 10:
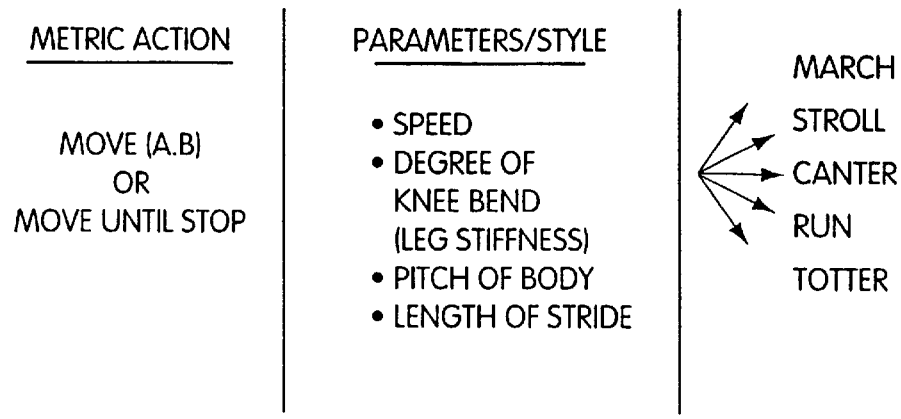
FIG. 10 is table listing actions in terms of movement versus style to provide control of a perambulating on-screen character as to emotive style.

Alternatively, rather than translating outputs into a set emotions, the accelerometer outputs can be used to select certain direct characteristics of the motion, such as the speed, amplitude, and orientation. FIG. 10 illustrates various types of parameters which might be adjusted for a walking character. Each of these values can be independently determined by a raw output of the device 20. The timing of the outputs can be used to represent each of the various parameters, and the value of the outputs represent the degree of the parameters. Each of these parameters are independent and effect the overall perception of the motion. To obtain faster movement, the step speed or the stride length can be increased, with different effects in the presentation of the motion.

The right hand column of FIG. 10 represents typical descriptions of types of walking movements. Each of these types of movements would correspond to a different set of values for each of the parameters. Furthermore, due to the continuous nature of the accelerometer outputs, each movement can be somewhere between the various types of movements.

Figure 11:
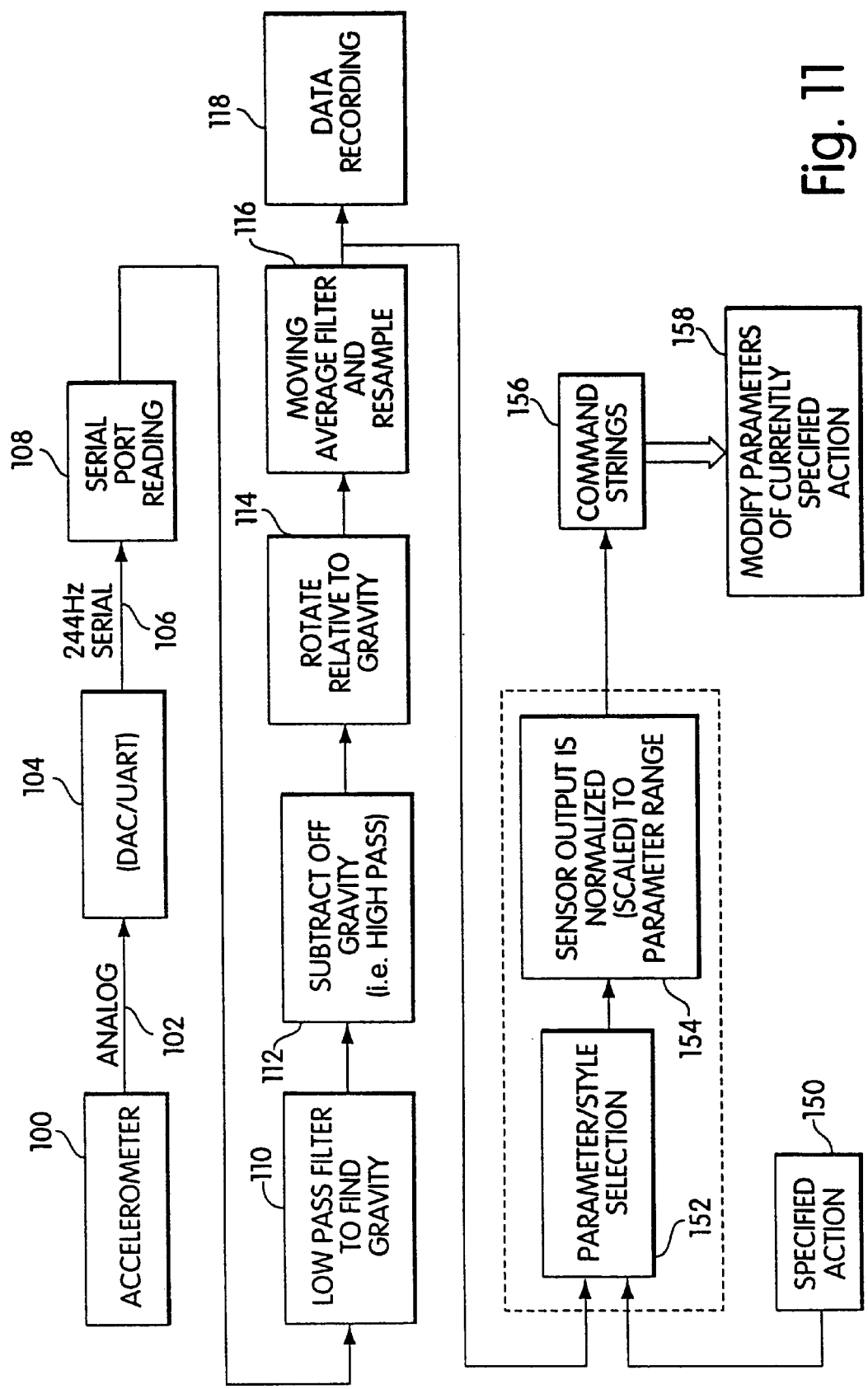
FIG. 11 is a block diagram of one embodiment of the subject invention in which accelerometer outputs are used directly to Control the style of a specified action without curve matching.

FIG. 11 illustrates processing of the accelerometer outputs in connection with parameter selection. Elements 100–118 correspond to the respective elements shown in FIG. 6. These elements provide the output of the accelerometer corrected for the gravitational element and filtered to remove high frequency components. The outputs are then provided to parameter selection unit 152. Since parameters may depend upon the type of action, the specified action 150 is also an input to the parameter selection unit 152. Preferably, as illustrated in FIGS. 4A and 4B, the order of motions can be used to select a type of motion and then the intensity or style of motion. The pattern recognition apparatus shown in FIG. 6 can operate until a desire motion is determined. If parameters are associated with the motion, then subsequent outputs of the device 20 can be used to select the parameters, as shown in FIG. 11. Each parameter may be selected in order according to successive movements of the device 20, or the outputs of the separate accelerometers in the device can be simultaneously processed for selecting multiple parameters.

Block 154 provides for scaling the sensor outputs to correspond to a parameter range. The speed and force of operation of the device 20 depends upon the user. Therefore, in order to account for differences of users, without loss of ranges of parameters, the sensor outputs must be scaled. The modified parameter values are provided to an interpreter unit 156 which produced command strings to control the movement. The parameters which are used to control the motion of the character on the screen are modified to provide the desired style of motion based upon the command strings.

Parameter control can also be used to provide stylistic operation of other elements of a character besides motion, most particularly with respect to speech. In another embodiment of the invention, the parameters which are controlled relate to attributes of speech, such as cadence, amplitude and fundamental frequency. For interactive processes, speech can provide a significant part of character control. The user may select what is to be said at a given time, or may simply control the manner in which it is said. For interactive theater, as in real theater, the lines are predetermined, but the actor presents the lines in a stylized manner. Speech synthesizers can be used to generate the words. By controlling the parameters of the speech, various styles, moods or emotions can be represented by the dialog.

The speech styles can be controlled jointly with motion or independently. The selected parameters can relate to emotions (as illustrated in FIG. 9) which are then translated into both movement and speech attributes. This would permit the consistent depiction of the character. Alternatively, the successive operation of the device 20 can be used to determine the motion attributes and speech attributes at different times.

Additionally, the present invention is not limited to use for manipulation of on-screen characters. The parameter selection process can be used with a speech synthesizer independently of a character in order to provide stylized speech in any context. The parameter control can also be used for selection of similar types of parameters in music generation to create a desired style. The parameter selection process can also be utilized in non-character motion, such as for computerized operation of robots and vehicles. Furthermore, an accelerometer device is not necessary to provide the outputs for parameter selection. Any type of output which permits continuous variation in sensor outputs can be used.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims.

What is claimed is:

1. An apparatus for providing stylized operation of an on-screen computerized character, comprising:

a housing moveable in free air;

at least one accelerometer, disposed within the housing, for generating an output representing an acceleration of the housing;

means for selecting a value of at least one style parameter relating to a characteristic of an operation of a character based upon the output; and means for controlling operation of the character based upon the selected style parameter;

wherein said operation includes speech, said at least one style parameter is one of a cadence, amplitude, and a fundamental frequency of the speech, and wherein said operation controlling means generates predefined words in accordance with the at least one stylized parameter.

2. An object control system, comprising:

a housing movable in free air;

a motion detector disposed within the housing and configured to detect motion caused by movement of the housing in the free air; and a transmitter configured to transmit signals representing the detected motion to control an object without regard to a relative position of the housing in the free air;

wherein the movement of the housing is movement which causes the housing to strike a rigid surface;

wherein the motion detector is further configured to detect the motion caused by the striking of the housing against the rigid surface; and wherein the detected motion caused by the striking of the housing against the rigid surface is undamped transient motion.

3. A method for controlling an object, comprising the steps of:

detecting motion caused by movement of a device in free air; and transmitting signals representing the detected motion to control an object without regard to a relative position of the device in the free air;

wherein the movement of the device is movement which causes the device to strike a rigid surface;

wherein the detected motion is undamped transient motion caused by the striking of the device against the rigid surface.

4. An object control system, comprising:

a housing moveable in free air;

accelerometers disposed within the housing and configured to detect accelerations caused by movement of the housing;

a decoder configured to determine the movement of the housing based on the detected accelerations; and an object controller configured to control a persona of the object in accordance with the determined movement of the housing.

5. A control system according to claim 4, wherein:

the object is a cartoon character; and the controlled persona is one of a human emotion and an intensity of a human emotion.

6. An object control system, comprising:

a housing moveable in free air;

accelerometers disposed within the housing and configured to detect accelerations caused by movement of the housing;

a decoder configured to determine the movement of the housing based on the detected accelerations; and an object controller configured to control a movement of the object in accordance with the determined movement of the housing;

wherein the controlled movement has a direction different than a direction of the determined movement of the housing.

7. An object control system, comprising:

a housing moveable in free air;

accelerometers disposed within the housing and configured to detect accelerations caused by movement of the housing;

a normalizer configured to normalize the detected acceleration to one of a local gravitational field vector and a time scale;

a decoder configured to determine the movement of the housing based on the normalized accelerations; and an object controller configured to control an object in accordance with the determined movement of the housing.

8. An object control system, comprising:

a housing moveable in free air;

accelerometers disposed within the housing and configured to detect accelerations caused by movement of the housing and to generate outputs corresponding thereto;

a scaler configured to convert the generated outputs to actual accelerations;

a decoder configured to determine the movement of the housing based on the actual accelerations; and an object controller configured to control an object in accordance with the determined movement of the housing.

9. An object control system, comprising:

a housing moveable in free air;

accelerometers disposed within the housing and configured to detect accelerations caused by movement of the housing;

a decoder configured to match the detected accelerations with template accelerations to determine an order of a plurality of movements of the housing; and an object controller configured to control an object to perform a type of action in accordance with the determined order of the plurality of the movements of the housing.

10. An object control system, comprising:

a housing moveable in free air;

accelerometers disposed within the housing and configured to detect accelerations caused by movement of the housing;

a decoder configured to determine the movement of the housing based on the detected accelerations; and an object controller configured to control the object in accordance with the determined movement of the housing such that speech attributes of the object are controlled.

11. A control system according to claim 10, wherein the controlled speech attributes include at least one of cadence, amplitude and fundamental frequency.

12. A control system according to claim 10, wherein the controlled speech attributes determine one of content of speech and manner of speech.

13. An object control system, comprising:

a housing moveable in free air;

accelerometers disposed within the housing and configured to detect accelerations caused by movement of the housing;

a decoder configured to determine the movement of the housing based on the detected accelerations;

a speech synthesizer configured to generate speech associated with the object; and an object controller configured to direct operation of the speech synthesizer to control the object in accordance with the determined movement of the housing such that attributes of the generated speech are controlled.

* * * * *